(12) United States Patent
Rysdyk et al.

(10) Patent No.: US 12,134,466 B2
(45) Date of Patent: Nov. 5, 2024

(54) UNMANNED AERIAL VEHICLES INCLUDING WING CAPTURE DEVICES AND RELATED METHODS

(71) Applicant: Insitu, Inc., Bingen, WA (US)

(72) Inventors: Rolf Rysdyk, Hood River, OR (US); Kelsey Nichole Underwood, Hood River, OR (US); Dustin Honea Volentine, Bend, OR (US)

(73) Assignee: Insitu, Inc., Bingen, WA (US)

( * ) Notice: Subject to any disclaimer, the term of this patent is extended or adjusted under 35 U.S.C. 154(b) by 0 days.

(21) Appl. No.: 17/397,686

(22) Filed: Aug. 9, 2021

(65) Prior Publication Data
US 2023/0039018 A1    Feb. 9, 2023

(51) Int. Cl.
| | |
|---|---|
| *B64C 25/68* | (2006.01) |
| *B64C 39/02* | (2023.01) |
| *B64U 10/25* | (2023.01) |
| *B64U 30/10* | (2023.01) |
| *B64U 70/30* | (2023.01) |

(52) U.S. Cl.
CPC ............ *B64C 25/68* (2013.01); *B64C 39/024* (2013.01); *B64U 10/25* (2023.01); *B64U 30/10* (2023.01); *B64U 70/30* (2023.01)

(58) Field of Classification Search
CPC ....... B64C 25/68; B64C 39/024; B64U 10/25; B64U 30/10; B64U 70/30; B64U 30/20
See application file for complete search history.

(56) References Cited

U.S. PATENT DOCUMENTS

| | | | | |
|---|---|---|---|---|
| 4,746,082 A | * | 5/1988 | Syms | B64D 47/08 343/705 |
| 7,398,946 B1 | * | 7/2008 | Marshall | B64C 39/024 244/12.3 |
| 9,120,560 B1 | * | 9/2015 | Armer | B64C 27/26 |
| D743,868 S | * | 11/2015 | Cummings | D12/328 |
| 9,340,301 B2 | * | 5/2016 | Dickson | B64C 39/024 |
| 9,878,787 B2 | * | 1/2018 | Chan | B60L 53/65 |
| 10,053,213 B1 | * | 8/2018 | Tu | B64C 27/26 |
| 10,081,436 B1 | * | 9/2018 | Tian | B64D 31/00 |
| 10,099,561 B1 | * | 10/2018 | Ananthanarayanan | B60L 53/32 |

(Continued)

FOREIGN PATENT DOCUMENTS

| | | |
|---|---|---|
| CN | 110498041 A | 11/2019 |
| WO | 2012047677 A2 | 4/2012 |
| WO | 2018/208652 | 11/2018 |

OTHER PUBLICATIONS

European Patent Office, "Extended European Search Report," issued in connection with European Patent Application No. 22189388.6, dated Jan. 2, 2023, 12 pages.

(Continued)

*Primary Examiner* — Medhat Badawi
(74) *Attorney, Agent, or Firm* — Hanley, Flight & Zimmerman, LLC (57) ABSTRACT

Unmanned aerial vehicles including wing capture devices and related methods are disclosed. An example unmanned aerial vehicle includes a fuselage and a wing assembly, the wing assembly including a shoulder coupled to the fuselage, the shoulder including a joint, the joint distal to the fuselage, a wing coupled to the joint, and a hook, the hook coupled to the shoulder, the hook including a groove to receive a cable to arrest flight of the unmanned aerial vehicle.

20 Claims, 6 Drawing Sheets

(56) References Cited

U.S. PATENT DOCUMENTS

| | | | |
|---|---|---|---|
| 10,112,711 B2* | 10/2018 | Hanna | B64U 70/90 |
| 10,124,890 B2* | 11/2018 | Sada-Salinas | B64C 39/024 |
| 10,183,744 B2* | 1/2019 | Gamble | B64C 27/30 |
| 10,186,348 B2* | 1/2019 | Davis | H02G 1/02 |
| 10,301,016 B1* | 5/2019 | Bondarev | B64C 29/0033 |
| 10,315,761 B2* | 6/2019 | McCullough | B64C 29/02 |
| 10,407,181 B2* | 9/2019 | Grubb | B64C 39/024 |
| 10,464,620 B2* | 11/2019 | Arigoni | G05D 1/027 |
| 10,513,350 B1* | 12/2019 | Kunz | B64F 1/029 |
| D872,681 S* | 1/2020 | Tzarnotzky | D12/329 |
| D873,202 S* | 1/2020 | Tzarnotzky | D12/329 |
| 10,696,419 B2* | 6/2020 | von Flotow | B64F 1/029 |
| 10,696,420 B2* | 6/2020 | von Flotow | F15B 9/14 |
| D890,074 S* | 7/2020 | Parvizian | D12/333 |
| 10,723,433 B2* | 7/2020 | Woodworth | B64C 1/069 |
| 10,800,545 B2* | 10/2020 | McDonnell | B64F 1/0297 |
| 10,933,997 B2* | 3/2021 | Hayes | B64C 29/0025 |
| 10,967,987 B2* | 4/2021 | Grubb | B64C 39/024 |
| 10,988,257 B2* | 4/2021 | von Flotow | B64C 27/14 |
| 11,027,844 B2* | 6/2021 | von Flotow | B64U 50/13 |
| 11,034,445 B2* | 6/2021 | Woodworth | B64C 39/024 |
| 11,066,185 B2* | 7/2021 | Dennis | B64F 1/10 |
| 11,142,339 B2* | 10/2021 | Dennis | B64F 1/029 |
| 11,204,612 B2* | 12/2021 | von Flotow | G05D 1/104 |
| 11,267,570 B2* | 3/2022 | Villa | B64C 23/00 |
| 11,286,059 B2* | 3/2022 | von Flotow | B64C 27/04 |
| 11,292,596 B2* | 4/2022 | Grubb | B64F 5/10 |
| 11,312,492 B1* | 4/2022 | von Flotow | B64U 10/13 |
| 11,325,698 B2* | 5/2022 | Millhouse | B64C 39/024 |
| 11,414,187 B2* | 8/2022 | von Flotow | B64F 1/36 |
| 11,447,246 B2* | 9/2022 | Kunz | B64U 10/10 |
| 11,511,854 B2* | 11/2022 | Baity | B64U 30/10 |
| 11,524,797 B2* | 12/2022 | von Flotow | B64C 39/024 |
| 2006/0091258 A1* | 5/2006 | Chiu | B64C 39/024 244/119 |
| 2009/0294584 A1* | 12/2009 | Lovell | B64C 39/024 901/30 |
| 2012/0043413 A1* | 2/2012 | Smith | B64C 29/0033 244/12.4 |
| 2012/0187243 A1 | 7/2012 | Goldie et al. | |
| 2013/0020429 A1* | 1/2013 | Kroo | B64C 39/12 244/6 |
| 2016/0236774 A1* | 8/2016 | Niedzballa | B64D 27/02 |
| 2016/0297520 A1* | 10/2016 | Sada-Salinas | B64D 27/24 |
| 2017/0225779 A1* | 8/2017 | Gamble | B64C 27/30 |
| 2017/0225784 A1* | 8/2017 | Hayes | B64D 5/00 |
| 2017/0300065 A1* | 10/2017 | Douglas | G05D 1/0055 |
| 2018/0086458 A1* | 3/2018 | Sartorius | B64D 9/00 |
| 2019/0061976 A1 | 2/2019 | Schweighart et al. | |
| 2019/0106192 A1* | 4/2019 | Woodworth | B64C 29/0025 |
| 2019/0168872 A1* | 6/2019 | Grubb | B64C 39/024 |
| 2019/0329882 A1* | 10/2019 | Baity | B64C 29/0033 |
| 2020/0070973 A1* | 3/2020 | Grubb | B64C 3/38 |
| 2020/0079505 A1 | 3/2020 | Stepura et al. | |
| 2020/0102070 A1* | 4/2020 | Lydecker | B64C 25/68 |
| 2020/0140082 A1 | 5/2020 | von Flotow et al. | |
| 2021/0078704 A1* | 3/2021 | Blakstad | B64D 27/24 |
| 2021/0197965 A1* | 7/2021 | Kunz | B64C 39/04 |
| 2022/0009626 A1* | 1/2022 | Baharav | B64C 27/26 |
| 2023/0039018 A1* | 2/2023 | Rysdyk | B64C 25/68 |

OTHER PUBLICATIONS

European Patent Office, "Communication pursuant to Article 94(3) EPC," issued in connection with European Patent Application No. 22189388.6, dated Jul. 19, 2024, 6 pages.

* cited by examiner

UNMANNED AERIAL VEHICLES INCLUDING WING CAPTURE DEVICES AND RELATED METHODS

FIELD OF THE DISCLOSURE

This disclosure relates generally to unmanned aerial vehicles and, more particularly, to unmanned aerial vehicles including wing capture devices and related methods.

BACKGROUND

An unmanned aerial vehicle (UAV) may be used in environments where a runway is not available to enable landing of the UAV, such as mountainous terrain or at sea. A recovery system including a boom or an arm that supports a cable may be placed in the environment to recover the UAV. A wing tip of, for instance, a fixed-wing UAV can include a hook to engage with the cable to arrest flight of the UAV.

SUMMARY

An example unmanned aerial vehicle includes a fuselage and a wing assembly, the wing assembly including a shoulder coupled to the fuselage, the shoulder including a joint, the joint distal to the fuselage, a wing coupled to the joint, and a hook, the hook coupled to the shoulder, the hook including a groove to receive a cable to arrest flight of the unmanned aerial vehicle.

An example aerial vehicle comprising a fuselage, a wing assembly, and a hook coupled to the wing assembly, the hook disposed in-board relative to the fuselage, the hook to latch with a cable to arrest flight of the aerial vehicle.

An example wing assembly to be coupled to a fuselage of an air vehicle, the wing assembly comprising a shoulder, a wing coupled to the shoulder, and means for coupling the air vehicle to a cable to arrest flight of the air vehicle, the coupling means coupled to the shoulder and distal from a tip of the wing.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc. are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

A fixed-wing unmanned aerial vehicle (UAV) may include a hook carried by a wing of the UAV at the tip of the wing. When the UAV operates in environments in which a runaway is not available and/or feasible, such as mountainous terrain or at sea, a recovery system including a vertically oriented boom, mast, or arm. The boom includes a cable extending along at least a portion of the boom. To stop flight of the UAV, the UAV flies toward the boom and couples with (e.g., latches to) the cable via the hook of the wing tip. For example, a leading edge of the wing can engage the cable to cause the cable to couple with the hook.

Some UAVs include modular wing assemblies in which a portion of the wing is removably couplable to a wing support carried by a body or a fuselage of the UAV. The wing support can include a joint to enable an outer portion of the wing to be replaced to provide variation in wing type, for repair, etc. For instance, a UAV that includes a fixed-style wing coupled to the wing support can be configured for vertical takeoff and landing by removably coupling a boom including one or more vertical lift rotor assemblies to the wing support.

Disclosed herein are example wing assemblies including a wing capture device or hook disposed in-board or proximate to a fuselage of an air vehicle including the wing assembly. Examples disclosed herein include modular wing assemblies that enable one or more components (e.g., wing structures) of the wing assembly to be replaced, added, etc. Example wing assemblies disclosed herein include a wing support or shoulder extending from the fuselage of the air vehicle. The wing shoulder can include a joint to couple a wing component to the shoulder and, thus, the air vehicle.

In examples disclosed herein, a wing capture device or hook is coupled to the wing shoulder. Thus, in examples disclosed herein, the hook is located in-board with respect to the fuselage of the air vehicle as compared to, for instance, a hook located at a tip of a wing coupled to the wing shoulder. For example, the hook can be coupled to a rib disposed in the wing shoulder.

In the examples disclosed herein, the in-board location of the hook at the wing shoulder provides structural advantages over a wing that includes a hook at the wing tip. For example, as a result of the in-board location of the hook, forces are not exerted on the wing tip when the air vehicle couples to the cable of the air vehicle recovery system as compared to air vehicles that include the hook at the wing tip. As a result, a material having less weight can be used to fabricate the wing as compared to materials composing a wing that includes the hook at the wing tip. Further, the ribs of the wing shoulder provide for increased structural support of the hook at the in-board location as compared to the wing tip, thereby improving a structural integrity of an air vehicle including a modular wing assembly.

Also, the in-board location of the hook reduces a length of a moment arm between the hook and the fuselage when the hook is coupled to the cable as compared to if the hook was located at the wing tip. Because of the smaller moment arm and, thus, associated forces, a lighter weight material can be used for the fuselage as well. Thus, the in-board location of the hook reduces weight of the air vehicle. Example hooks disclosed herein can be added to existing air vehicles, including air vehicles with or without modular wing assemblies. For example, the hook can be coupled to a wing of a fixed-wing air vehicle at an in-board location on the existing wing.

Figure 1:
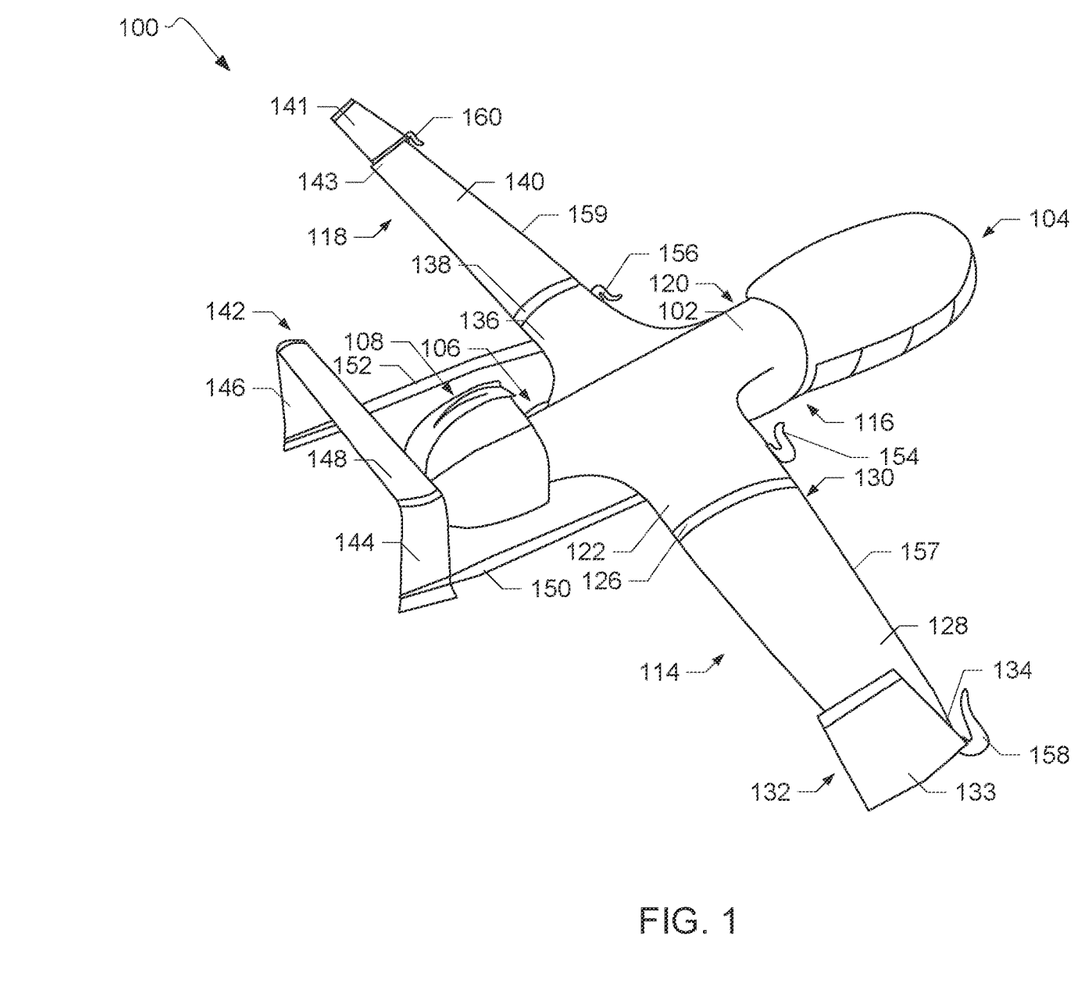
FIG. 1 illustrates an example air vehicle including one or more wing capture devices in accordance with teachings of this disclosure.

FIG. 1 illustrates an example air vehicle 100 in accordance with teachings of this disclosure. The example air vehicle 100 of FIG. 1 is an unmanned aerial vehicle. The example air vehicle 100 of FIG. 1 can be launched and/or recovered without a runway. For example, the air vehicle 100 can be launched via a catapult launcher. The air vehicle 100 can be recovered (i.e., flight of the air vehicle 100 is arrested) by coupling with (e.g., latching to) a cable or cord suspended from a boom of an air vehicle recovery system.

The example air vehicle 100 of FIG. 1 includes a fuselage 102 having a first (e.g., forward) end 104 and a second (e.g., aft) end 106 opposite the first end 104. A shape of the fuselage 102 can differ from the example shown in FIG. 1. A forward thrust system 108 is located proximate to the second end 106 of the fuselage 102 to propel the air vehicle 100. The forward thrust system 108 can include, for instance, an engine and one or more propellers. The air vehicle 100 can include additional forward thrust systems and/or forward thrust system(s) located at different location(s) relative to the fuselage 102 than the example shown in FIG. 1.

As illustrated in FIG. 1, a first wing assembly 114 extends from a first side 116 of the fuselage 102 and a second wing assembly 118 extends from a second side 120 of the fuselage 102 opposite the first side 116. The example air vehicle 100 of FIG. 1 is a mid-wing air vehicle in that the wing assemblies 114, 118 are coupled to the fuselage 102 along the respective sides 116, 120 of the fuselage 102 between a top and a bottom of the fuselage 102. In the example of FIG. 1, the first and second wing assemblies 114, 118 are modular wing assemblies in that one or more wing components are removably couplable to the respective wing assemblies 114, 118, for instance, to facilitate changing a wing type of the air vehicle 100.

The example first wing assembly 114 of FIG. 1 includes a first shoulder 122 coupled to the fuselage 102. As disclosed herein, a frame of the first shoulder 122 is defined by ribs and/or spars. The first shoulder 122 of the example first wing assembly 114 of FIG. 1 includes a first joint 126 distal to the fuselage 102. As disclosed herein, the first joint 126 provides means for coupling one or more wing components to the first wing assembly 114. For example, as shown in FIG. 1, a first wing 128 is removably coupled to the first joint 126. The first wing 128 includes a first end 130 and a second end 132 including a tip 134. In the example of FIG. 1, a first winglet 133 extends from the tip 134. The first end 130 of the first wing 128 can include a spar (not shown) to be received in a pocket defined in a rib (not shown) of the first joint 126 to couple the first wing 128 to the first shoulder 122.

The example second wing assembly 118 of FIG. 1 includes the same or substantially the same components as the first wing assembly 114. For instance, the second wing assembly 118 includes a second shoulder 136 including a second joint 138 to removably couple one or more wing components to the second shoulder 136, as disclosed in connection with the first wing assembly 114. A second wing 140 is removably coupled to the second joint 138. In the example of FIG. 1, the second wing 140 includes a second winglet 141 extending from a tip 143 of the second wing 140.

When the first and second wings 128, 140 are coupled to the respective first and second shoulders 122, 136, the air vehicle 100 can be operated as a fixed-wing aircraft. In the example of FIG. 1, the air vehicle 100 includes a tail assembly 142 including a first vertical tail 144, and a second vertical tail 146, and a horizontal tail 148 extending therebetween. A first tail boom 150 couples the first vertical tail 144 to the first shoulder 122 of the first wing assembly 114 and a second tail boom 152 couples the second vertical tail 146 to the second shoulder 136 of the second wing assembly 118. In the example of FIG. 1, the tail booms 150, 152 are coupled (e.g., mechanically coupled) to the respective wing shoulders 122, 136 (e.g., to a rib of the respective wing shoulders 122, 136 via mechanical fastener(s) extending through the wing shoulder 122, 136). In other examples, the tail booms 150, 152 are coupled to the respective first and second joints 126, 138. A configuration and/or placement of the tail assembly 142 can differ from the example shown in FIG. 1. In other examples, the air vehicle 100 does not include the tail assembly 142.

The example first wing assembly 114 includes a first hook 154 coupled to the first shoulder 122 via one or more mechanical fasteners (e.g., screws, pins). In the example of FIG. 1, the first hook 154 is coupled to the first shoulder 122 at a leading edge 157 of the first wing assembly 114. As disclosed herein (FIG. 2), in some examples, the first hook 154 is coupled to a rib disposed in the first wing shoulder 122. In other examples, the first hook 154 is coupled to a different portion of the first shoulder 122.

The example second wing assembly 118 includes a second hook 156 mechanically coupled to the second shoulder 136 of the second wing assembly 118. The second hook 156 is coupled to a leading edge 159 of the second wing assembly 118. The second hook 156 can be mechanically coupled to, for instance, a rib disposed in the second shoulder 136. In other examples, one or more of the first hook 154 or the second hook 156 is coupled to a different portion of the air vehicle 100 (e.g., the joint(s) 126, 138; the end 130 of the first wing 128; a portion of the fuselage 102).

The first hook 154 and the second hook 156 each provide means for coupling the air vehicle 100 with a cable of an air vehicle recovery system to arrest flight of the air vehicle 100 instead of using a runway. For example, during flight of the air vehicle 100, the air vehicle 100 flies toward a boom or mast of the air vehicle recovery system. The leading edge 157, 159 of one of the first wing assembly 114 or the second wing assembly 118 engages with (e.g., contacts) a cable extending along a boom of an air vehicle recovery system to facilitate a coupling between the cable and the first hook 154 or the second hook 156. The cable can couple with the first hook 157 or the second hook 156 based on, for example, an orientation of the air vehicle 100 relative to the boom. In the example of FIG. 1, the first hook 154 and the second hook 156 are coupled to the respective first and second shoulders 122, 136 at a distance from the fuselage 102. The respective distances between the fuselage 102 and the locations at which the hooks 154, 156 are coupled to the wing shoulders 122, 137 are selected to provide for clearance between the fuselage 102 and the hooks 154, 156 to enable the hooks 154, 156 to couple with the cable of the air vehicle recovery system.

The first wing 128 can be removed from the first wing shoulder 122 and a different wing component can be coupled to the wing shoulder 122 that may or may not include a wing capture device (e.g., a hook). However, the location of the first hook 154 at the first wing shoulder 122 provides the air vehicle 100 with a wing capture device regardless of whether the modular wing component coupled to the wing shoulder 122 includes a hook. Similarly, the second wing 140 can be removed from the second wing shoulder 136 and replaced with a different wing component that may or may not include a wing capture device. However, the location of the second hook 156 at the second wing shoulder 136 provides the air vehicle 100 with a wing capture device regardless of whether the modular wing component coupled to the wing shoulder 136 includes a hook. Thus, the hooks 154, 156 can be coupled to locations in the modular wing assemblies 114, 118 (e.g., the wing shoulder(s) 122, 136) that are not replaced during exchange of the (e.g., outer) wing components.

The in-board locations of the first hook 154 and the second hook 156 enables a lighter weight material to be used for the outer wings 128, 140 as compared to if the hooks 154, 156 were (i.e., only) coupled to the wing tips 134, 143 of the wings 128, 140. For instance, because forces are not exerted on the wing tips 134, 143 when the corresponding hook 154, 156 couples with the cable of the air vehicle recovery system, at least a portion of the wing 128, 140 including the tip 134, 143 can be formed from a lighter weight material, thereby reducing a weight of the air vehicle 100. Rather, the wing shoulders 122, 136 (e.g., ribs of the wing shoulders 122, 136) provide structural support for the hooks 154, 156. Also, a length of a moment arm between the hook 154, 156 and the fuselage 102 when the hook 154, 156 is coupled to the cable is shortened as compared to if the hook 154, 156 was located at the wing tip 134, 143. Because of the smaller moment arm and, thus, associated forces, a lighter weight material can be used for the fuselage As shown in FIG. 1, in some examples, a third hook 158 is coupled to the wing tip 134 of the first wing 128. Also, a fourth hook 160 can be coupled to the wing tip 143 of the second wing 140. The third hook 158 and the fourth hook 160 can serve as fail safe hooks in the event the air vehicle 100 is unable to couple with the cable of the air vehicle recovery system via the first hook 154 and/or the second hook 156. In other examples, the air vehicle 100 does not include the third hook 158 and/or the fourth hook 160.

Although the example air vehicle 100 of FIG. 1 includes the modular wing assemblies 114, 118 that provide for removable coupling of wing components, in other examples, the air vehicle 100 includes fixed wing assemblies. In such examples, the first hook 154 can be coupled to a portion of one of the fixed wings proximate the fuselage 102 and distal to the tip of the wing. Similarly, in such examples, the second hook 156 is coupled to a portion of the other fixed wing proximate to the fuselage 102 and distal to the tip of that wing. For instance, the hooks 154, 156 can be coupled to respective ribs of the fixed wings that are disposed in-board relative to the fuselage 102. In such examples, a strength of the material used manufacture at least a portion of the fixed wings (e.g., portion(s) of the wing(s) including the tip(s)) can be reduced as compared to if the hooks were (i.e., only) located at the tips because of the structural support for the hooks at the in-board locations.

Figure 2:
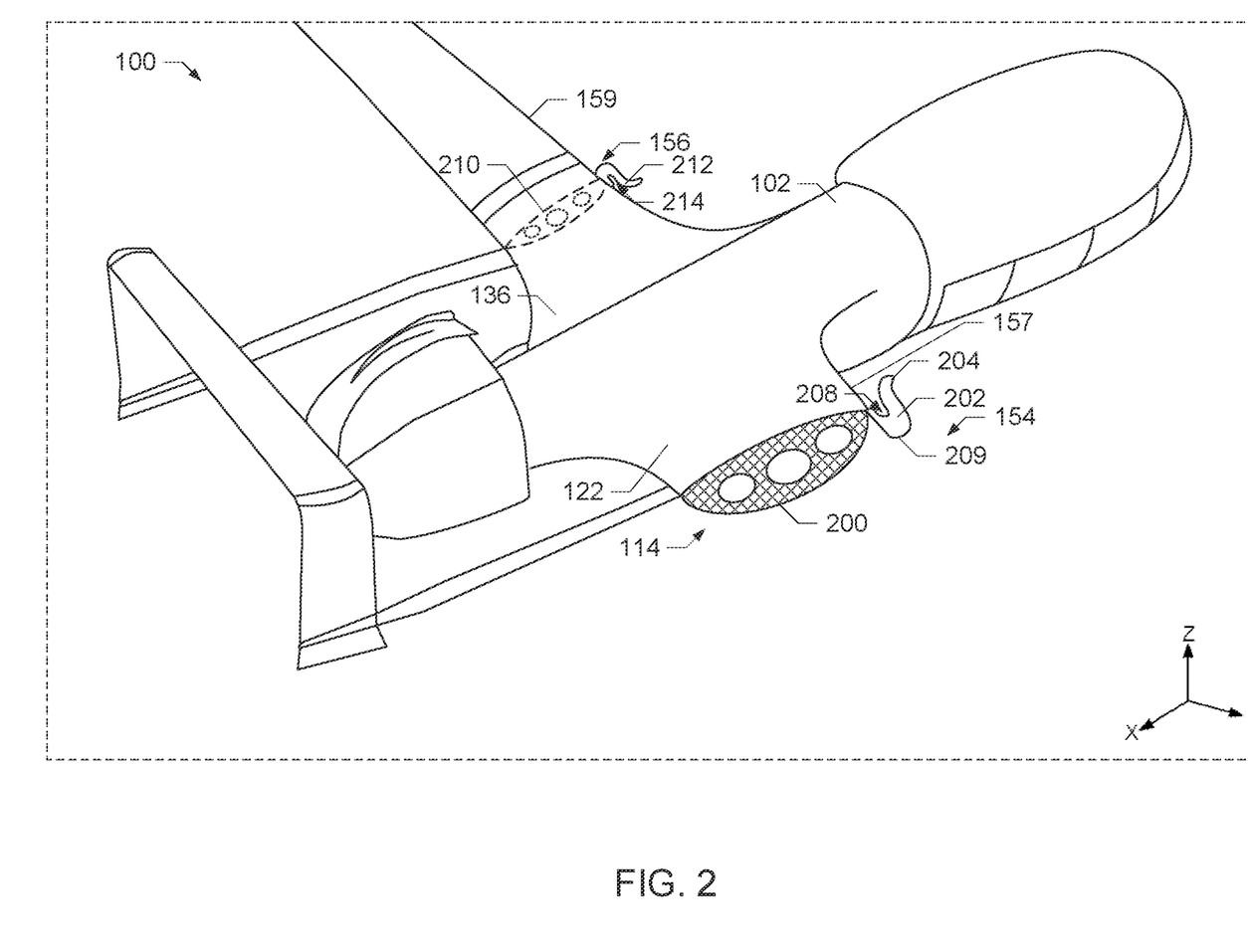
FIG. 2 illustrates a cutaway view of a wing assembly of the example air vehicle of FIG. 1.

FIG. 2 illustrates a cutaway view the example air vehicle 100. In particular, FIG. 2 illustrates a cutaway view of the first shoulder 122 of the first wing assembly 114. For illustrative purposes, the first wing 128 is not shown in FIG. 2.

The first shoulder 122 of the first wing assembly 114 includes a rib 200. In the example of FIG. 2, the first hook 154 is coupled to the rib 200 via mechanical fastener(s). For example, the mechanical fastener(s) (e.g., pins, threaded fastener(s)) can extend through opening(s) defined in a surface of the first shoulder 122 to couple the first hook 154 to the rib 200.

In the example of FIG. 2, the first hook 154 is oriented such that a first surface 202 of the first hook 154 substantially lies along an X-Y plane when the first hook 154 is coupled to the rib 200. As shown in FIG. 2, an end 204 of the first hook 154 is directed toward the fuselage 102. Put another away, the first surface 202 of the first hook 154 is substantially in-plane with at least a portion of the first wing assembly 114 in the X-Y direction. The orientation of the first surface 202 of the first hook 154 with respect to the X-Y plane reduces interference of the first hook 154 with airflow over the leading edge 157 of the first wing assembly 114 as compared to if, for example, the end 204 of the first hook 154 extended in the Z-direction.

As shown in FIG. 2, a groove 208 is defined in the first hook 154. The groove 208 enables the first hook 154 to couple with (e.g., latch to) a cable of the air vehicle recovery system. When the first hook 154 is coupled to the rib 200, the groove 208 is disposed between the fuselage 102 and an edge 209 of the first hook 154 that is distal to the fuselage 102 to facilitate retention of the cable in the groove 208.

Similarly, the second hook 156 can be coupled to a rib 210 (represented by dashed line in FIG. 2) of the second shoulder 136 of the second wing assembly 118. The second hook 156 can be coupled to the rib 210 via mechanical fastener(s) extending through a surface of the second shoulder 136. Also, the second hook 156 is oriented such that a first surface 212 of the second hook 156 substantially lies along the X-Y plane when the second hook 156 is coupled to the second shoulder 136 to reduce interference with airflow over leading edge 159 of the second wing assembly 118. As shown in FIG. 2, the second hook 156 includes a groove 214 defined therein to receive a portion of a cable of an air vehicle recovery system to couple the air vehicle 100 to the cable to stop flight of the air vehicle 100.

Figure 3A:
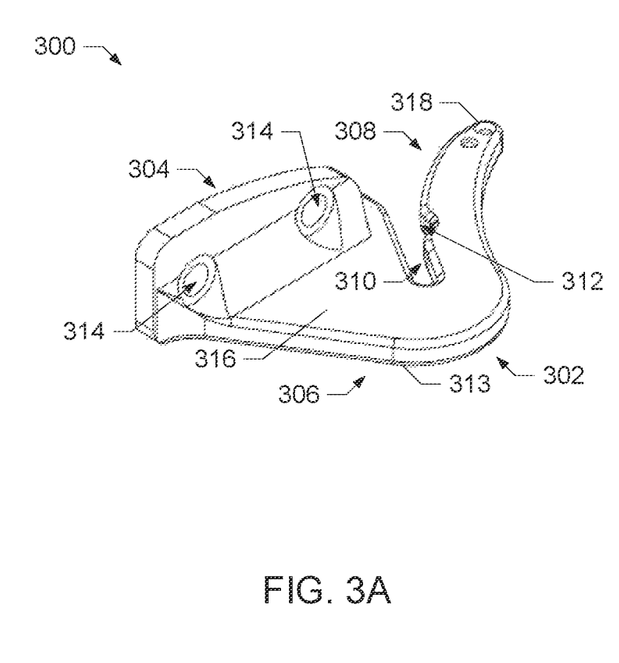
FIGS. 3A and 3B illustrate an example wing capture device in accordance with teachings of this disclosure.
Figure 3B:
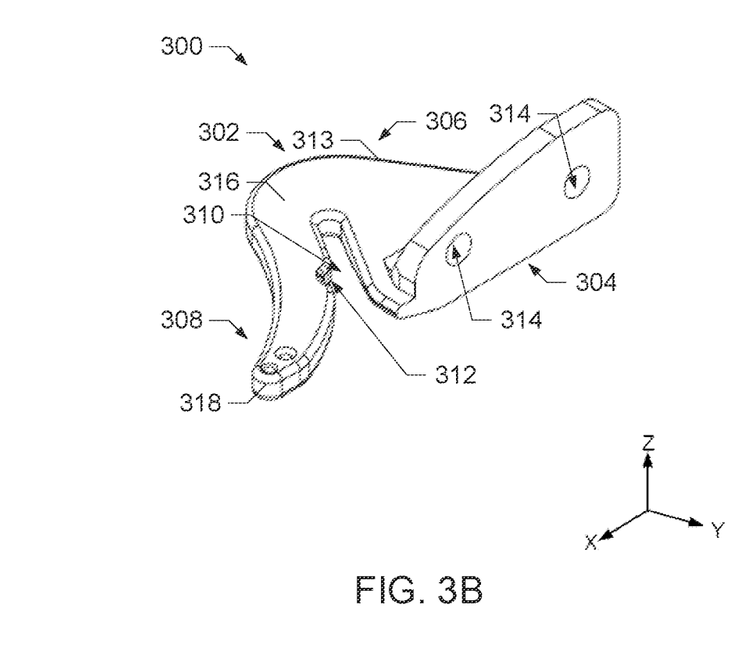

FIGS. 3A and 3B illustrate an example wing capture device or hook 300 in accordance with teachings of this disclosure. The example hook 300 of FIGS. 3A and 3B can be used with an air vehicle such as the example air vehicle 100 of FIG. 1. The hook 300 of FIGS. 3A and 3B can be used as any of the first hook 154, the second hook 156, the third hook 158, and/or the fourth hook 160 of FIG. 1. The hook 300 can be formed from material(s) such as titanium or aluminum.

The example hook 300 of FIGS. 3A and 3B includes a hook portion 302 and a fastener portion 304. The hook portion 302 and the fastener portion 304 can be formed from one piece. As shown in FIG. 3, the fastener portion 304 is disposed at an angle relative to the hook portion 302. The hook portion 302 of the hook 300 includes a base portion 306 and an extender portion 308.

As shown in FIGS. 3A and 3B, a groove 310 is defined between the base portion 306 and the extender portion 308. The groove 310 can be formed via, for instance, extrusion. The groove 310 has a size (e.g., width) to enable a portion of a cable of an air vehicle recovery system to be received in the groove 310. In some examples, a width of the groove 310 enables the groove 310 to receive and retain the cable to, for instance, prevent the air vehicle 100 from sliding along the cable. The extender portion 308 extends from the base portion 306 and helps to retain the portion of the cable in the groove 310. For example, a notch 312 is formed in the hook portion 302 of the hook 300 proximate to the groove 310 to help retain the cable in the groove 310.

The fastener portion 304 extends from the base portion 306. The fastener portion 304 includes one or more openings 314 to receive fasteners to couple the hook 300 to a wing assembly. For example, the fastener portion 304 can be placed against (e.g., in contact with) a surface of the wing shoulder 122, 136 of the wing assembly 114, 118 of FIG. 1. The fasteners can extend through the openings 314 of the fastener portion 304 and the surface of the wing shoulder to fasten the hook 300 to a rib of the wing shoulder 122, 136 (e.g., the rib 200, 210 of FIG. 2). In the example of FIGS. 3A and 3B, the fastener portion 304 includes two openings 314. However, the fastener portion 304 can include fewer or additional openings based on, for example, the type of fastener(s) to be used to couple the hook 300 to the wing assembly. A size and/or shape of the openings 314 can differ from the example shown in FIGS. 3A and 3B based on the type of fasteners to be used to couple the hook 300 to the wing assembly 114, 118.

As disclosed in connection with FIG. 2, when the hook 300 is coupled to the wing assembly 114, 116, a surface 316 of the hook portion 302 substantially lies along an X-Y plane. Also, an end 318 of the extender portion 308 is directed toward the fuselage 102 of the air vehicle 102. The groove 310 is disposed between the fuselage 102 and an edge 313 of the hook portion 302 that is distal to the fuselage 102 when the hook 300 is coupled to the wing assembly 114, 116.

A shape of the hook 300 and/or one or more components thereof (e.g., a shape of the groove 310, a curvature of the hook portion 302) can differ from the example shown in FIG. 3.

Figure 4:
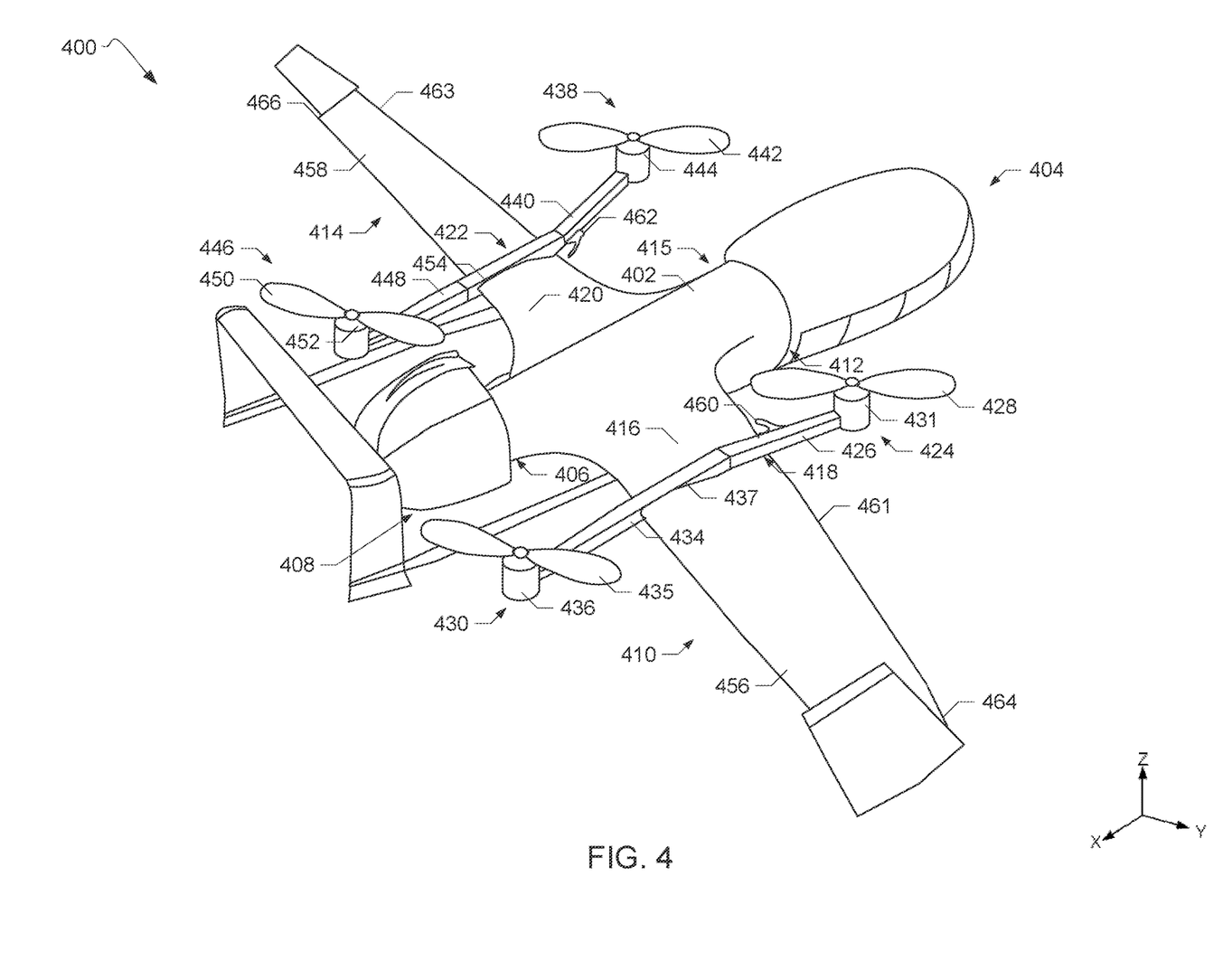
FIG. 4 illustrates another example air vehicle including one or more wing capture devices in accordance with teachings of this disclosure.

FIG. 4 illustrates another example air vehicle 400 in accordance with teachings of this disclosure. The example air vehicle 400 is an unmanned aerial vehicle. The example air vehicle 400 of FIG. 4 can be launched and/or recovered without a runway as discussed in connection with the example air vehicle 100 of FIG. 1.

The example air vehicle 400 includes a fuselage 402 having a first (e.g., forward) end 404 and a second (e.g., aft) end 406 opposite the first end 404. A forward thrust system 408 is located proximate to the second end 406 of the fuselage 402 to propel the air vehicle 400.

A first wing assembly 410 extends from a first side 412 of the fuselage 402 and a second wing assembly 414 extends from a second side 415 of the fuselage 402. The first and second wing assemblies 410, 414 of FIG. 4 are modular wing assemblies in that one or more wing components are removably couplable to the respective wing assemblies 410, 414 as disclosed in connection with the example wing assemblies 114, 118 of FIG. 1. For example, the first wing assembly 410 includes a first shoulder 416 including a first joint 418 to removably couple one or more wing components to the first shoulder 416. The second wing assembly 414 includes a second shoulder 420 including a second joint 422 to removably couple one or more wing components to the second shoulder 420.

The example air vehicle 400 of FIG. 4 includes rotor assemblies that provide the air vehicle 400 with vertical take-off and landing (VTOL) capabilities. A first rotor assembly 424 is coupled to the first joint 418 of the first shoulder 416 via a first boom 426. The first rotor assembly 424 includes a first rotor 428 driven by a first motor 431. A second rotor assembly 430 is coupled to the first joint 418 of the first shoulder 416 via a second boom 434. The second rotor assembly 430 includes a second rotor 435 driven by a second motor 436. In some examples, the first and second booms 426, 434 are coupled to the first joint 418 via a first boom mounting portion 437.

A third rotor assembly 438 is coupled to the second joint 422 of the second shoulder 420 via a third boom 440. The third rotor assembly 438 includes a third rotor 442 driven by a third motor 444. A fourth rotor assembly 446 is coupled to the second joint 422 of the second shoulder 420 via a fourth boom 448. The fourth rotor assembly 446 includes a fourth rotor 450 driven by a fourth motor 452. Thus, the example air vehicle 400 has a quadcopter configuration. In some examples, the third and fourth booms 440, 448 are coupled to the second joint 422 via a second boom mounting portion 454.

In the example of FIG. 4, the air vehicle 400 can also act as a fixed-wing aircraft. A first wing 456 is coupled to the first joint 418. In the example of FIG. 4, the first rotor assembly 424 and the second rotor assembly 430 are disposed between the first shoulder 416 and the first wing 456. For example, the first boom mounting portion 437 can include an opening to receive a spar of the first wing 456 to enable the first wing 456 to couple with the first joint 418. The first wing 456, the rotor booms 426, 434 of the respective first and second rotor assemblies 424, 430, and/or the first boom mounting portion 437 can couple to the first joint 418 in a different manner (e.g., the first boom mounting portion 437 can be clamped between the first wing 456 and the first joint 418; the rotor booms 426, 434 can be mechanically coupled to the first joint 418 via mechanical fastener(s), etc.).

A second wing 458 is coupled to the second joint 422. In the example of FIG. 4, the third and fourth rotor assemblies 438, 446 are disposed between the second shoulder 420 and the second wing 458 as disclosed in connection with the first and second rotor assemblies 424, 430.

The example rotor assemblies 424, 430, 438, 446 can include additional or fewer rotors and/or rotors having different shapes, numbers of blades, etc. and/or disposed at different locations on the respective rotor booms 426, 434, 440, 448, etc. than shown in FIG. 1. In some examples, the air vehicle 400 of FIG. 4 includes the rotor assemblies 424, 430, 438, 446 but does not include the wings 456, 458 (e.g., the air vehicle 400 is a quadcopter).

The example wing assemblies 410, 414 include wing capture devices or hooks to enable the air vehicle 400 to couple with a cable of an air vehicle recovery system as disclosed in connection with the example air vehicle 100 of FIG. 1. In the example of FIG. 4, a first hook 460 is carried by (e.g., integrally formed with or mechanically coupled to) the first boom 426. In particular, the first hook 460 is carried by the first boom 426 at a location in-board from the first rotor assembly 424 (e.g., proximate to the first joint 418 of the first shoulder 416, proximate to a leading edge 461 of the first wing assembly 410). In other examples, the first hook 460 is carried by the second boom 434 at a location in-board from the second rotor assembly 430. In some examples, the first boom 426 and the second boom 434 each include the first hook 460.

In the example of FIG. 4, a second hook 462 is carried by (e.g., integrally formed with or mechanically coupled to) the third boom 440 at a location in-board from the third rotor assembly 438 (e.g., proximate to the second joint 422 of the second shoulder 420, proximate to a leading edge 463 of the second wing assembly 414). In other examples, the second hook 462 is carried by the fourth boom 448 at a location in-board from the fourth rotor assembly 446. In some examples, the third boom 440 and the fourth boom 448 each include the second hook 462.

The in-board locations of the first hook 460 and the second hook 462 enable a wingspan of the outer wings 456, 458 to be shortened as compared to if the hooks 460, 462 were (i.e., only) located at respective tips 464, 466 of the wings 456, 458. Also, a lower weight material can be used to manufacture the outer wings 456, 458 because of the in-board location of the hooks 460, 462. In other examples, the tip(s) 464, 466 of the wing(s) 456, 458 include hook for fail-safe purposes, as disclosed in connection with the hooks 158, 160 of FIG. 1.

In some examples, the air vehicle 400 of FIG. 4 is a modified version of the air vehicle 100 of FIG. 1. For examples, the air vehicle 100 of FIG. 1 can be modified to include the rotor assemblies 424, 430, 438, 446 by coupling the rotor booms 426, 434, 440, 448 and/or the rotor mounting portions 437, 454 to the respective wing shoulders 122, 136 of FIG. 1. In some examples, the first and second hooks 154, 156 coupled to the wing shoulders 122, 136 can be removed (e.g., uncoupled from the shoulders 122, 136) during conversion of the air vehicle 100 to a quad-copter configuration in view of the hook(s) 460, 462 carried by the rotor booms 426, 434, 440, 448.

Figure 5:
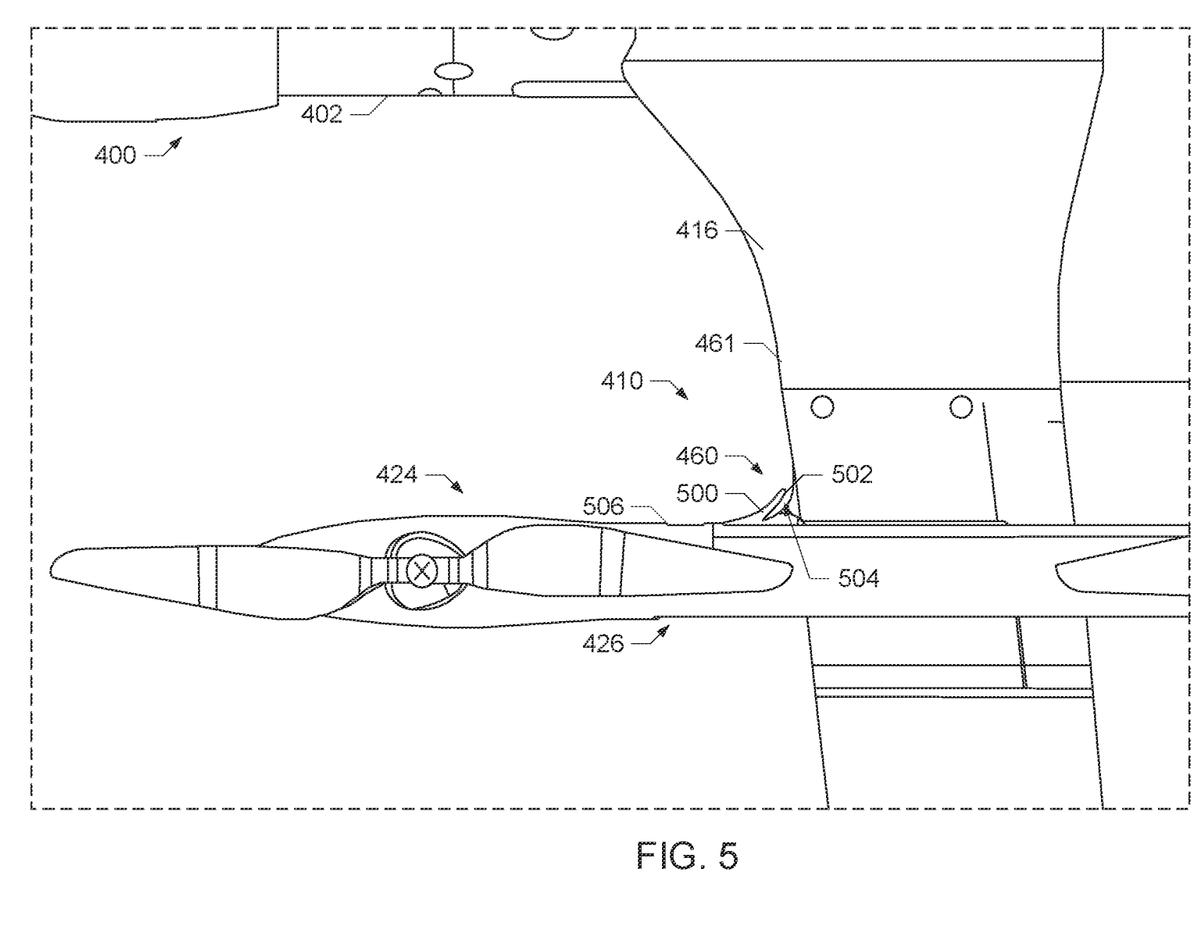
FIG. 5 is a partial view of the example air vehicle of FIG. 4.

FIG. 5 is a partial view of the example air vehicle 400 of FIG. 4 and, in particular, shows the first rotor assembly 424 and the first boom 426 of FIG. 4. As shown in FIG. 5, the first boom 426 supports the first hook 460. In some examples, the first hook 460 is integrally formed with the first boom 426. In other examples, the first hook 460 is coupled to the first boom 426 via mechanical fastener(s) (e.g., threaded fastener(s), pin(s)).

The first hook 460 is disposed in-board from the first rotor assembly 424 proximate to the first shoulder 416 of the first wing assembly 410 and/or the leading edge 461 of the first wing assembly 410. As shown in FIG. 5, a surface 500 of the first hook 460 lies along an X-Y plane to reduce interference with airflow over, for example, the leading edge 461 of the first wing assembly 410. An end 502 of the first hook 460 is directed toward the fuselage 402 when the first hook 402 is coupled to the first boom 426. Thus, the first hook 460 is substantially in-plane with at least a portion of the first wing assembly 410 in the X-Y direction. The first hook 460 includes a groove 504 to receive a cable of an air vehicle recover system. As shown in FIG. 5 the first hook 460 is located on a first side 506 of the first boom 426 facing the fuselage 402 of the air vehicle 400 to facilitate retention of the cable in the groove 504.

One or more portions of the first hook 460 can be the same or substantially the same as the example hook 300 of FIG. 3 (e.g., the hook portion 302, the groove 310). Also, the second hook 462 of FIG. 4 can be the same or substantially the same as the first hook 460 shown in FIG. 5.

Figure 6:
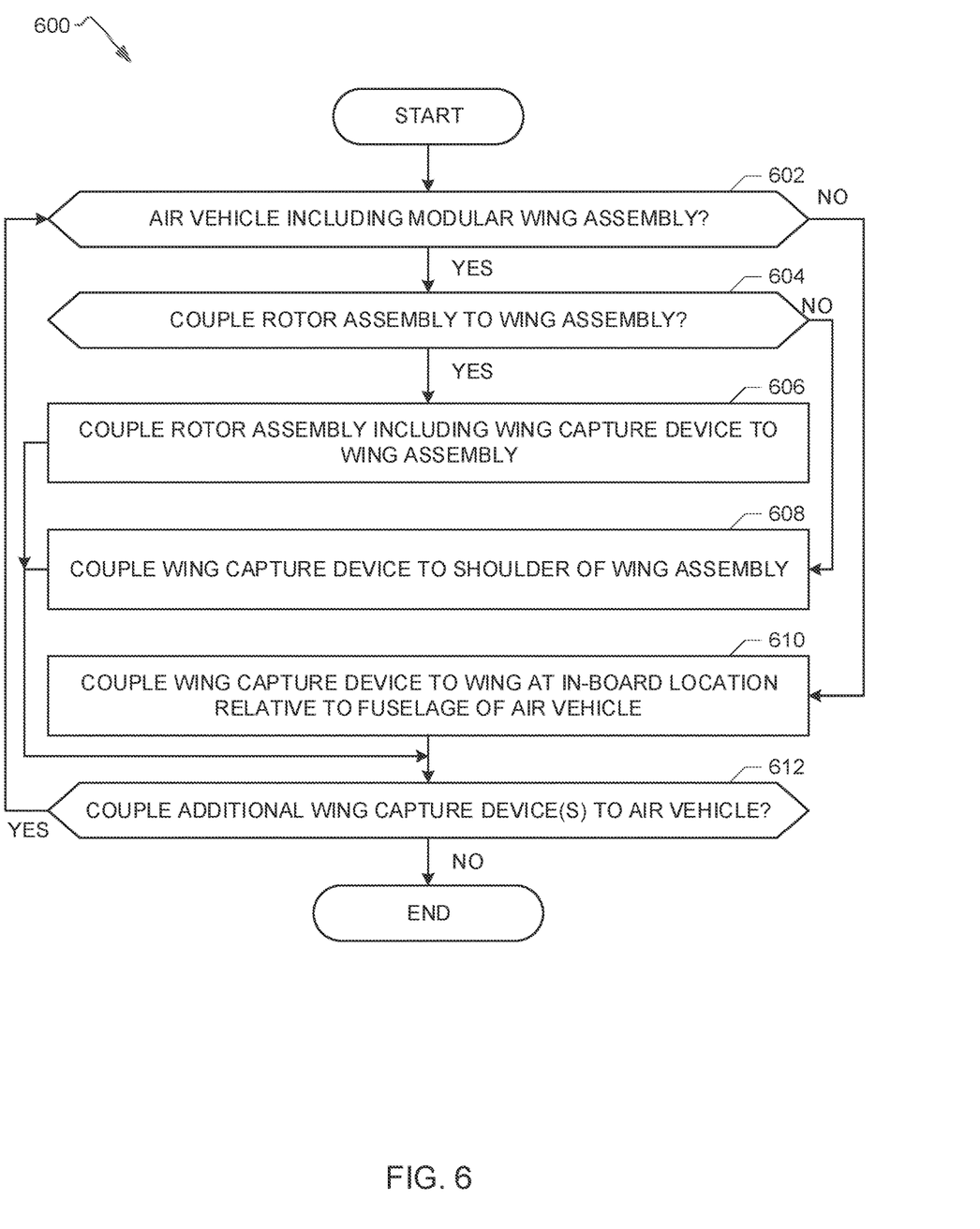
FIG. 6 is flowchart of an example method for assembling an air vehicle including one or more wing capture devices in accordance with teachings of this disclosure.

FIG. 6 illustrates an example method 600 of assembling an air vehicle, such as the example air vehicles 100, 400 of FIG. 1 or 4, including one or more wing capture devices, such as the example hooks 154, 156, 158, 160, 300, 460, 462 of FIGS. 1-5. In the example method 600, if at block 602, the air vehicle 100, 400 includes a modular wing assembly 114, 118, 410, 414, then a determination is made at block 604 if a rotor assembly 424, 430, 438, 446 is to be coupled to the wing assembly 114, 118, 410, 414 (e.g., to a wing shoulder 122, 136, 416, 420). If a rotor assembly 424, 430, 438, 446 is to be coupled to the wing assembly 114, 118, 410, 414, then at block 606, a rotor assembly including a wing capture device 300, 460, 462 is coupled to the wing assembly. For example, the first rotor assembly 424 of FIGS. 4 and 5 including the first hook 460 carried by the first boom 426 can be coupled to the first shoulder 416 of the first wing assembly 410 via the first joint 418. The first hook 460 can be mechanically coupled to the first boom 426 or integrally formed with the first boom 426. When the first rotor assembly 424 is coupled to the first joint 418, the first hook 416 is disposed in-board or proximate to the first joint 418.

If a rotor assembly 424, 430, 438, 446 is not to be coupled to the wing assembly 114, 118, 410, 414, then at block 608, a wing capture device 154, 156, 300 is coupled to a shoulder 122, 136, 416, 420 of the wing assembly 114, 118, 410, 414. For example, the hook 154, 156, 300 of FIGS. 1-3 can be mechanically coupled to a rib 200 disposed in the first shoulder 122 of the first wing assembly 114 via mechanical fastener(s) extending through a fastener portion 304 of the hook 154, 156, 300 and a surface of the first shoulder 122. The hook 154, 156, 300 can be oriented such as that a surface 202, 316 of the hook 154, 156, 300 lies in an X-Y plane and an end 204, 318 of the hook 154, 156, 300 is proximate a fuselage 102, 402 of the air vehicle 100, 400. The hook 154, 156, 300 can be coupled to a leading edge 157, 159 of the wing assembly 114, 118.

If the air vehicle does not include a modular wing assembly, then at block 610, the wing capture device 300 is coupled to a wing of the air vehicle at a location inboard relative to a fuselage of the air vehicle. Put another way, the wing capture device 300 is coupled to a location on the wing that is proximate to the fuselage and distal to a tip of the wing. The wing capture device 300 can be coupled to a leading edge of the wing with a surface 316 of the wing capture device 300 in-plane with at least a portion the wing assembly in an X-Y direction.

At block 612, a determination is made if other wing capture devices should be coupled to the air vehicle. For example, a wing capture device can be coupled to a wing assembly on an opposing side of the air vehicle 100, 400. Also, back-up or fail safe hook(s) 158, 160 can be coupled to tip(s) of the wing(s) 128, 140, 456, 458. The example method 600 ends when no further wing capture devices are to be coupled to the air vehicle.

Although the example method 600 is described with reference to the flowchart illustrated in FIG. 6, many other methods of assembling an air vehicle including a wing capture device may alternatively be used. For example, the order of execution of the blocks may be changed, and/or some of the blocks described may be changed, eliminated, or combined. Similarly, additional operations may be included in the manufacturing process before, in between, or after the blocks shown in FIG. 6.

From the foregoing, it will be appreciated that example systems, methods, apparatus, and articles of manufacture have been disclosed that provide for unmanned aerial vehicles including wing capture devices located in-board relative to a fuselage of the aerial vehicle. Example wing capture devices disclosed herein can be coupled to, for example, a shoulder of a wing assembly extending from a fuselage of the air vehicle. The in-board locations of the example wing capture devices disclosed herein enable lighter weight materials to be used to construct wings of the air vehicle as compared to air vehicles in which the wing captured devices are located at a tip of the air vehicle. Also, in examples in which the wing capture device is coupled to a modular wing assembly, the in-board location can provide increased structural support for the wing capture device and enable wing components constructed from lighter weight materials to be removably coupled to the wing assembly. Thus, examples disclosed herein provide for aerial vehicles having reduced weight.

Example unmanned aerial vehicles including wing capture devices and related methods are disclosed herein. Further examples and combinations thereof include the following:

Example 1 includes an unmanned aerial vehicle including a fuselage and a wing assembly, the wing assembly including a shoulder coupled to the fuselage, the shoulder including a joint, the joint distal to the fuselage; a wing coupled to the joint; and a hook, the hook coupled to the shoulder, the hook including a groove to receive a cable to arrest flight of the unmanned aerial vehicle.

Example 2 includes the unmanned aerial vehicle of example 1, wherein the hook is coupled to a rib of the shoulder.

Example 3 includes the unmanned aerial vehicle of examples 1 or 2, wherein the hook is disposed at a leading edge of the wing assembly.

Example 4 includes the unmanned aerial vehicle of any of examples 1-3, wherein the hook is a first hook and further including a second hook coupled to a tip of the wing.

Example 5 includes he unmanned aerial vehicle of any of examples 1-4, wherein the wing assembly is a first wing assembly, the hook is a first hook, the shoulder is a first shoulder, and further including a second wing assembly, the second wing assembly including a second shoulder coupled to the fuselage; a second wing coupled to the second shoulder; and a second hook, the second hook coupled to the second shoulder.

Example 6 includes the unmanned aerial vehicle of any of examples 1-5, wherein the groove is defined in a surface of the hook, the groove disposed between the fuselage and an edge of the hook distal to the fuselage when the hook is coupled to the shoulder.

Example 7 includes the unmanned aerial vehicle of any of examples 1-6, wherein the hook includes a notch, the notch disposed proximate to the groove.

Example 8 includes an aerial vehicle including a fuselage; a wing assembly; and a hook coupled to the wing assembly, the hook disposed in-board relative to the fuselage, the hook to latch with a cable to arrest flight of the aerial vehicle.

Example 9 includes the aerial vehicle of example 8, wherein the hook is coupled to a shoulder of the wing assembly, the shoulder coupled to the fuselage.

Example 10 includes the aerial vehicle of examples 8 or 9, wherein the wing assembly includes a rotor assembly and a boom to support the rotor assembly, the hook coupled to the boom.

Example 11 includes the aerial vehicle of any of examples 8-10, wherein the wing assembly includes a joint, the boom coupled to the wing assembly via the joint, the hook disposed proximate to the joint.

Example 12 includes the aerial vehicle of any of examples 8-11, wherein the hook is coupled to a side of the boom facing the fuselage.

Example 13 includes the aerial vehicle of any of examples 8-12, wherein the hook is coupled to a rib of the wing assembly.

Example 14 includes the aerial vehicle of any of examples 8-13, wherein the wing assembly includes a shoulder and a wing removably coupled to the shoulder, the hook coupled to a rib disposed in the shoulder.

Example 15 includes the aerial vehicle of any of examples 8-14, wherein the hook is disposed proximate to a leading edge of the wing assembly.

Example 16 includes a wing assembly to be coupled to a fuselage of an air vehicle, the wing assembly including a shoulder; a wing coupled to the shoulder; and means for coupling the air vehicle to a cable to arrest flight of the air vehicle, the coupling means coupled to the shoulder and distal from a tip of the wing.

Example 17 includes the wing assembly of example 16, wherein the coupling means is coupled to a rib of the shoulder.

Example 18 includes the wing assembly of examples 16 or 17, wherein the coupling means is coupled to the shoulder at a leading edge of the wing assembly.

Example 19 includes the wing assembly of any of examples 16-18, wherein the coupling means include a hook.

Example 20 includes the wing assembly of any of examples 16-19, further including a boom, the coupling means is coupled to the shoulder via a boom, the boom supporting a rotor assembly.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

The following claims are hereby incorporated into this Detailed Description by this reference, with each claim standing on its own as a separate embodiment of the present disclosure.

What is claimed is:

1. An unmanned aerial vehicle comprising:
   a fuselage; and
   a wing assembly, the wing assembly including:
     a shoulder coupled to the fuselage, the shoulder including a joint, the joint distal to the fuselage;
     a wing coupled to the joint;
     a boom supporting a rotor; and
     a hook coupled to the boom at a location on the boom forward of a leading edge of the shoulder, the hook including a groove to receive a cable to arrest flight of the unmanned aerial vehicle.

2. The unmanned aerial vehicle of claim 1, wherein the hook is a first hook and further including a second hook coupled to a tip of the wing.

3. The unmanned aerial vehicle of claim 1, wherein the wing assembly is a first wing assembly, the hook is a first hook, the shoulder is a first shoulder, the boom is a first boom, the rotor is a first rotor, and further including a second wing assembly, the second wing assembly including:
   a second shoulder coupled to the fuselage;
   a second wing coupled to the second shoulder
   a second boom supporting a second rotor; and
   a second hook, the second hook coupled to the second boom.

4. The unmanned aerial vehicle of claim 1, wherein the groove is defined in a surface of the hook, the groove disposed between the fuselage and an edge of the hook distal to the fuselage.

5. The unmanned aerial vehicle of claim 4, wherein the hook includes a notch, the notch disposed proximate to the groove.

6. An aerial vehicle comprising:
   a fuselage;
   a wing coupled to the fuselage;
   a boom extending from the wing, the boom supporting a rotor; and
   a hook coupled to a side of the boom facing the fuselage, the hook to latch with a cable to arrest flight of the aerial vehicle.

7. The aerial vehicle of claim 6, wherein the wing is coupled to a shoulder, the shoulder coupled to the fuselage.

8. The aerial vehicle of claim 6, wherein the boom is coupled to the fuselage via a joint, the hook disposed proximate to the joint.

9. The aerial vehicle of claim 7, wherein the hook is coupled to a location on the side of the boom proximate the shoulder.

10. The aerial vehicle of claim 6, wherein the hook is disposed forward of a leading edge of the wing.

11. A wing assembly to be coupled to a fuselage of an air vehicle, the wing assembly comprising:
    a shoulder;
    a wing coupled to the shoulder;
    a boom coupled to the shoulder, the boom supporting a rotor; and
    means for coupling the air vehicle to a cable to arrest flight of the air vehicle, the coupling means carried by the boom, the coupling means disposed forward of a leading edge of the shoulder and distal from a tip of the wing.

12. The wing assembly of claim 11, wherein the coupling means include a hook.

13. The unmanned aerial vehicle of claim 1, wherein the hook is coupled to a side of the boom facing the fuselage.

14. The unmanned aerial vehicle of claim 1, wherein the hook is proximate to the shoulder.

15. The aerial vehicle of claim 6, wherein an end of the hook is directed toward the fuselage.

16. The aerial vehicle of claim 7, wherein at least a portion of the hook is in-plane with a portion of the shoulder.

17. The aerial vehicle of claim 10, wherein the rotor is disposed forward of the leading edge of the wing and forward of the hook.

18. The wing assembly of claim 11, wherein the boom includes a first end proximate to the shoulder and a second end distal from the shoulder, the coupling means proximate to the first end of the boom.

19. The wing assembly of claim 11, wherein the coupling means is disposed between the boom and the fuselage.

20. The wing assembly of claim 11, wherein the coupling means is integrally formed with the boom.

* * * * *